G. MEIER.
PLUMBING CONNECTION.
APPLICATION FILED APR. 21, 1919.
1,346,788.
Patented July 13, 1920.
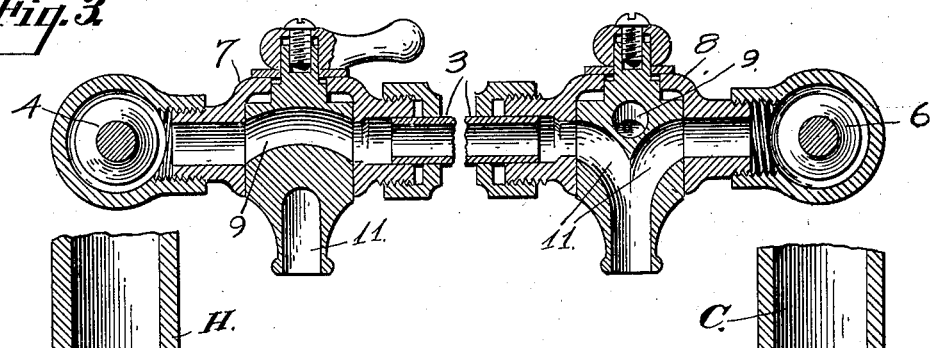
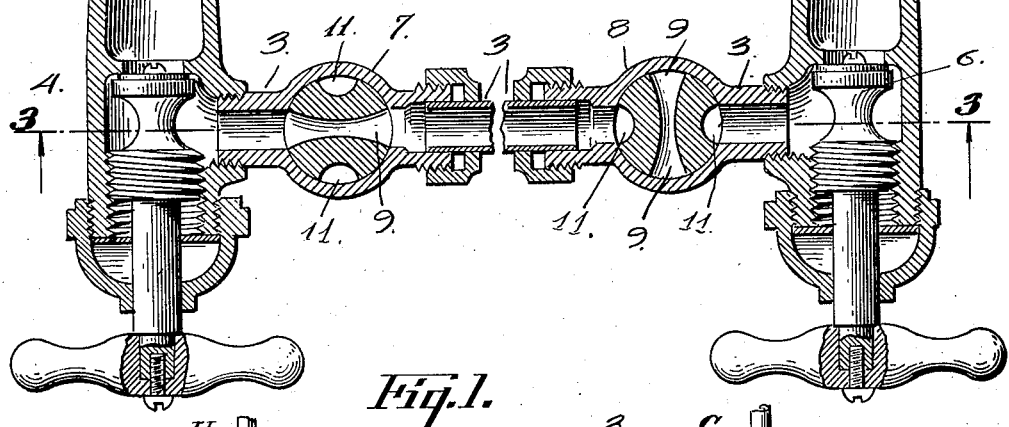
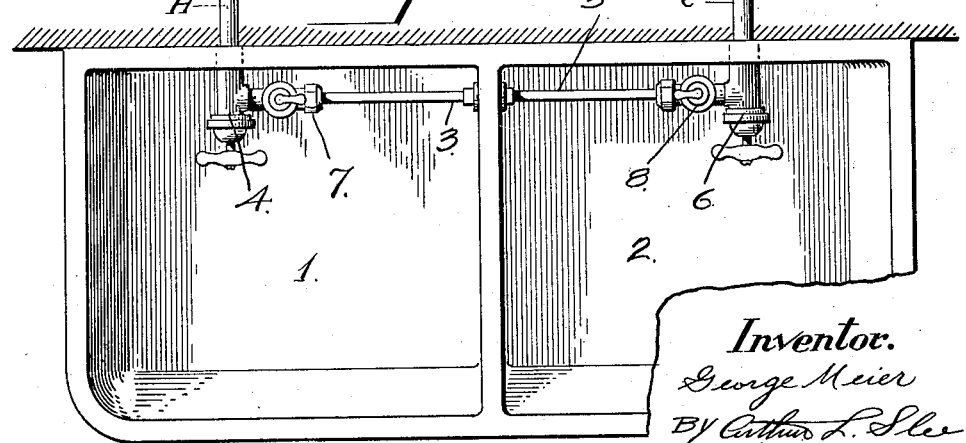
Inventor.
George Meier
By Arthur L. Slee
ATTY.

UNITED STATES PATENT OFFICE.

GEORGE MEIER, OF SAN FRANCISCO, CALIFORNIA.

PLUMBING CONNECTION.

1,346,788.      Specification of Letters Patent.      Patented July 13, 1920.

Application filed April 21, 1919. Serial No. 291,763.

*To all whom it may concern:*

Be it known that I, GEORGE MEIER, a subject of Germany, residing in the city and county of San Francisco and State of California, have invented a certain new and useful Improvement in Plumbing Connections, of which the following is a specification.

My invention relates to improvements in plumbing connections wherein double apertured cock operates in conjunction with a connection between hot and cold water pipes.

The primary object of the present invention is to provide an improved plumbing connection for one or more wash trays wherein the amount of piping may be considerably reduced.

It is also an object of the present invention to provide an improved plumbing connection wherein a single pipe connection extending through or over the trays may be utilized to deliver hot and cold water to either tray.

It is a still further object to provide a simplified and improved connection for two or more adjacent wash trays whereby a single cock or faucet only is required for each tray, thereby reducing the amount of material and the expense of installation.

I accomplish these and other objects by means of the improved device disclosed in the drawings forming a part of the present specification wherein like characters of reference are used to designate similar parts throughout the said specification, and in which:

Figure 1 is a broken plan view of a pair of wash trays disclosing my improved connection applied thereto;

Fig. 2 is an enlarged horizontal, longitudinal broken sectional view of the connection removed from the trays; and Fig. 3 is a longitudinal sectional view taken on line 3—3 in the direction indicated.

Referring to the drawings the numeral 1 is used to designate two wash trays of the usual type having hot and cold water pipes, H and C, connected thereto, respectively.

A connection 3 is provided to connect the pipes H and C and suitable cocks 4 and 6 are connected to the pipes H and C respectively to regulate and control the passage of hot and cold water from said pipes to the connection 3.

Cocks 7 and 8 are mounted within the connection and over the trays 1 and 2 respectively. Each cock 7 and 8 is provided with a by-pass aperture 9 arranged to register with the connection 3 on each side of said cock when turned to one position, thereby permitting the passage of water through said cock, and with connected outlet apertures 11 arranged to register with the connection 3 on each side of said cock 7 and 8 thereby permitting the passage of water from the connection 3 to the trays, when turned in the opposite position.

The registering portions of the by-pass aperture 9 and the outlet apertures 11 are arranged at right angles to each other so that when the by-pass aperture 9 registers with the connection 3 on each side of its respective cock the registering apertures of the outlet apertures 11 will be closed by the housing of the said cock and vice versa as disclosed in Fig. 2 of the drawings.

In operation, cold water is passed to tray 2 by opening the cold water cock 6 connecting the cold water pipe C with the connection 3 and turning the cock 8 to the position disclosed in Figs. 2 and 3 of the drawings, wherein the outlet aperture 11 will be positioned to register with the connection 3 on each side thereof.

If hot water is desired in the tray 2 the cold water cock 6 is closed and the hot water cock 4 is opened. The water will then pass from the pipe H, through the cock 4, connection 3 and by-pass aperture 9 of the cock 7 and again through the remaining portion of the connection 3 to the outlet aperture 11 of the cock 8 and into the tray 2.

If hot water is desired in the tray 1 the cock 8 is positioned to register the by-pass aperture 9 therein with the connection 3 on each side thereof and the cock 7 over the tray 1 is turned to register the outlet apertures 11 with the connection 3 when the water will flow from said aperture 11 into the tray 1. If cold water is desired in tray 1 the hot water cock 4 is closed and the cold water cock 6 is opened. Water will then flow from said cold water pipe C through the by-pass aperture 9 of the cock 8 and through the connection 3 to the outlet aperture 11 of the cock 7.

It is obvious that more than two trays may be operated by means of the same connection, in which case it is only necessary to add one cock, similar to cock 7 or 8, to the connection 3 which may extend through all of the trays, as water may readily pass through the by-pass apertures 9 of any number of cocks to the outlet aperture 11 of any cock situated or positioned over the tray within which water is required.

Having thus described my invention, what I claim as new and desire to secure by Letters Patent is:

1. In a plumbing connection, the combination with a plurality of wash trays of a hot water connection; a cold water connection; a third connection connecting the hot and cold water connections; and means mounted within the last mentioned connection for opening the same to permit the passage of hot and cold water therefrom into any one of the trays.

2. In a plumbing connection, the combination with a plurality of wash trays of a hot water pipe connected to one of the trays; a cold water pipe connecting to another of the trays; a connection between the pipes; and cocks mounted within the connection one over each tray, said cocks each having a by-pass aperture and two outlet apertures whereby water may flow through said cocks when turned in one direction and into a tray when turned in the opposite direction.

3. In a plumbing connection, the combination with a plurality of wash trays of a hot water pipe connected to one of the trays; a cold water pipe connecting to another of the trays; a connection between the pipes; and cocks mounted within the connection one over each tray, said cocks each having a by-pass aperture and two outlet apertures whereby water may flow through said cocks when turned in one direction and into a tray when turned in the opposite direction; and means for regulating the flow of hot and cold water through the hot and cold water pipes.

4. In a plumbing connection, the combination with a plurality of wash trays of a hot water pipe connected to one end tray; a cold water pipe connected to the other end tray; a connection between the pipes and passing over the trays; and means mounted within the connection for permitting the passage of water therethrough when in one position, and for permitting the passage of water from said connection into a tray when turned to another position.

5. In a plumbing connection, the combination with a plurality of wash trays of a hot water pipe connected to one end tray; a cold water pipe connected to the other end tray; a connection between the pipes and passing over the trays; means mounted within the connection for permitting the passage of water therethrough when in one position, and for permitting the passage of water from said connection into a tray when turned to another position; and means for regulating the flow of water through the hot and cold water pipes.

6. In a plumbing connection, the combination with a plurality of wash trays of a hot water pipe connected to one end tray; a cold water pipe connected to the other end tray; a connection passing over the trays and connecting the pipes; and a cock mounted over each tray and within the connection, each cock having a by-pass aperture and connected outlet apertures whereby the passage of water through the connection may be permitted when the by-pass aperture registers with the connection on each side of the cock, and the passage of water may be admitted to the respective tray when the outlet apertures are registered with the connection.

7. In a plumbing connection, the combination with a plurality of wash trays of a hot water pipe connected to one end tray; a cold water pipe connected to the other end tray; a connection passing over the trays and connecting the pipes; a cock mounted over each tray and within the connection, each cock having a by-pass aperture and connected outlet apertures whereby the passage of water through the connection may be permitted when the by-pass aperture registers with the connection on each side of the cock, and the passage of water may be permitted to the respective tray when the outlet apertures are registered with the connection; and a cock connected to each of the hot and cold water pipes to regulate the passage of water to the connection.

In witness whereof I hereunto set my signature.

GEORGE MEIER.